UNITED STATES PATENT OFFICE.

JOHN HARCOURT BROWN, OF ABBEY MILL HOUSE, ROMSEY, ENGLAND.

IMPROVEMENT IN PREPARATION OF GRANULATED GUNPOWDER TO SERVE AS CHARGES FOR FIRE-ARMS.

Specification forming part of Letters Patent No. 33,069, dated August 20, 1861.

*To all whom it may concern:*

Be it known that I, JOHN HARCOURT BROWN, of Abbey Mill House, Romsey, in the county of Hants, England, a subject of the Queen of Great Britain, have invented or discovered new and useful Improvements in the Preparation of Gunpowder for Loading Ordnance and Fire-Arms; and I, the said JOHN HARCOURT BROWN, do hereby declare the nature of the said invention and in what manner the same is to be performed to be particularly described and ascertained in and by the following statement thereof—that is to say:

The object of this invention is to prepare gunpowder in compressed cakes or charges suitable for and to fit the various bores of cannon, rifles, muskets, and other fire-arms without destroying the granulations of the powder or injuring its explosive quality, so that the powder and charges thus prepared may remain in store in suitable cases for several years without deterioration, and when used the whole charge may be deposited in the breech of the piece, cannon, or other fire-arm without confining it in paper or other extraneous material, and yet without any loose grains lodging in the grooves of rifled cannon or other fire-arms.

In preparing the gunpowder I employ a solution of spirit or fluid which will not prejudicially act on the gunpowder, containing an admixture of gumaceous or adhesive matter, and deposit the same in molds of brass, gun-metal, or other suitable material, of the necessary form and size for containing the required charge, and by the application of pressure I compress it into a cake or charge. I regulate the pressure so as to bring the grains of powder into close contact and cause them to adhere together without destroying the granulations.

In applying the solution to the powder I find it desirable to spread it evenly on the surfaces of plates or cylinders of brass, gun-metal, or other suitable material, and then to sprinkle the grains of powder over the plate or cylinder, allowing it to adhere thereto. The powder so adhering is then removed by scrapers from the plates or cylinders and deposited in molds suitable for containing the required charges, as before stated, and then the requisite amount of pressure above mentioned is applied to form the charges. On removing the compressed charges of powder from the molds the spirit evaporates and the charges become hard and fit for use or for being stored away.

The solution I prefer to employ is prepared as follows: I take at the rate of one pound of clean picked gum-arabic and make a mucilage by dissolving it in two pounds of cold water. I also dissolve a quarter of a pound of nitrate of potash in five times its weight of cold water, which I add to the mucilage of gum-arabic, and when intimately mixed I add a pound of spirits of wine, and well triturate the solution until a uniform opaque fluid is produced, which is fit for use in the manner above explained.

Having thus described the nature of my invention and the manner of performing the same, I would have it understood that I do not confine myself to the adhesive solution above described, as others may be used in carrying out my invention. Neither do I confine myself to the manner of applying the adhesive solution to the grains of gunpowder, nor the forms of the mold used; but I prefer that each charge of gunpowder should be made somewhat conical at the end which is to be first ignited.

I claim—

As an improved article of manufacture, a charge for loading ordnance and fire-arms as made by combining and pressing grains of gunpowder with an adhesive solution into a solid form, substantially in manner as set forth.

J. H. BROWN.

Witnesses:
    WM. BRASIER,
24 *Southampton Buildings, Chancery Lane, London.*
    THOS. BROWN,
2 *George Yard, Lombard Street, London.*